United States Patent [19]

Marsden, Jr. et al.

[11] Patent Number: 5,660,500
[45] Date of Patent: Aug. 26, 1997

[54] ENHANCED DEEP SOIL VAPOR EXTRACTION PROCESS AND APPARATUS UTILIZING SHEET METAL PILINGS

[75] Inventors: Arnold Riley Marsden, Jr., Mount Vernon, Wash.; David Alan Weingaertner, Framingham, Mass.; Lynton William Robert Dicks; Arthur Lamar Otermat, both of Houston, Tex.; Paul Carr Johnson, Fountain Hills, Ariz.

[73] Assignee: Shell Oil Company, Houston, Tex.

[21] Appl. No.: 572,915

[22] Filed: Dec. 15, 1995

[51] Int. Cl.⁶ .................. E02D 3/11; B09B 3/00; A62D 3/00
[52] U.S. Cl. .......... 405/128; 405/131; 405/258; 405/267; 588/249; 588/259
[58] Field of Search .................. 405/128, 129, 405/266, 267, 274–281, 131; 166/248, 265

[56] References Cited

U.S. PATENT DOCUMENTS

| | | |
|---|---|---|
| 4,593,760 | 6/1986 | Visser et al. .................. 166/267 |
| 4,660,639 | 4/1987 | Visser et al. .................. 166/267 |
| 4,664,560 | 5/1987 | Cortlever ..................... 405/258 |
| 4,670,634 | 6/1987 | Bridges et al. ............... 219/10.41 |
| 4,842,448 | 6/1989 | Koerner et al. ............... 405/258 |
| 4,900,196 | 2/1990 | Bridges ....................... 405/128 X |
| 4,984,594 | 1/1991 | Vinegar et al. ............... 134/21 |
| 5,011,329 | 4/1991 | Nelson et al. ................. 405/128 |
| 5,076,727 | 12/1991 | Johnson et al. ............... 405/128 |
| 5,199,488 | 4/1993 | Kasevich et al. .............. 405/128 X |
| 5,318,116 | 6/1994 | Vinegar et al. ............... 405/128 X |
| 5,330,291 | 7/1994 | Heath et al. .................. 405/128 |
| 5,435,666 | 7/1995 | Hassett et al. ................ 405/258 X |
| B1 4,376,598 | 3/1983 | Brounds et al. ............... 405/258 |

Primary Examiner—Dennis L. Taylor
Attorney, Agent, or Firm—Donna Blalock Holguin; Y. Grace Tsang

[57] ABSTRACT

A system for in situ decontamination of contaminated soil in a contaminated zone comprising:

a. a metal section placed in the contaminated soil, b. a heating means attached to said metal section for heating said metal section, and c. an extraction system adjacent or near said metal section for withdrawing vapors and condensates generated from heating the contaminated soil.

9 Claims, 1 Drawing Sheet

ENHANCED DEEP SOIL VAPOR EXTRACTION PROCESS AND APPARATUS UTILIZING SHEET METAL PILINGS

FIELD OF THE INVENTION

The present invention is directed to the remediation of volatile and semi-volatile contaminants from subsurface soils by in-situ heating using sheet metal pilings.

BACKGROUND OF THE INVENTION

A variety of methods have been proposed for the remediation of soil containing organic contaminants. Many of the proposed methods involve removal and subsequent incineration of soil with the attendant difficulties of treatment and/or disposal of off-gases. A major detriment to such processes, however, is the cost of excavating and transporting the soil which can result in a total cost approaching several hundred U.S. dollars per ton of soil.

To avoid at least a portion of these costs, several types of in-situ soil heating processes have been proposed including steam or hot air heating of the soil through an auger system or through stationary pipes, radio-frequency, vitrification of the soil by electrode heating, or electrical heating of the soil by means of a surface heater.

An auger system for injecting steam or hot air has been practiced commercially. This method has limited use though, primarily in the decontamination of soil containing small areas of deep contamination such as localized spills or leakages at service stations.

A process for steam injection through stationary pipes has also been practiced commercially. This process which uses steam to heat the soil is limited by the amount of condensate that can be tolerated in the soil without causing contaminants to be leached to the ground water, or at least without clogging the soil pore volume with water which inhibits or restricts vapor or air flow. Also soil temperature is limited so it is practical only for the more volatile chemicals.

Brouns et al, U.S. Pat. No. 4,376,598, disclose a vitrification process in which the soil is heated to approximately 1500° C. At or about this temperature, the soil forms a glass-like mass which traps the contaminants therein. This process destroys organic contaminants. However, for inorganic contaminants, it is, in reality, a stabilization process rather than a decontamination process since the soil undergoing treatment has lost its physical and chemical identity.

Bridges et al, U.S. Pat. No. 4,670,634, disclose an in-situ thermal process wherein the thermal energy is supplied by radio-frequency antennas for heating. The radio-frequency antennas may be placed on the ground or in the ground. This process is particularly applicable to water-containing soils where the steam generated in the soil serves to strip the organic contaminants from the soil. A somewhat related process is disclosed in Assignee's U.S. Pat. No. 4,984,594 wherein the thermal energy is supplied by a relatively flat electrical heater deployed at the surface of the soil. In this later process, a vacuum is applied at the surface of the soil to remove vapors generated within the soil.

U.S. Patent No. 4,842,448, issued to Koerner et al discloses a method and apparatus for in-situ removal of contaminants from soil comprising a barrier having a permeable inner layer and an impermeable outer layer overlying the contaminated soil and a vacuum system for reducing pressure under the barrier and withdrawing contaminants from the contaminated soil.

In Assignee's U.S. Patent No. 5,076,727, moist warm air from a vapor treatment system is injected into wells which are screened (perforated) only at the contaminated depth forcing air and vapor flow only through the contaminated region. Between the injection wells is an extraction well which is also screened only at the contaminated depth. A vacuum is drawn on the extraction well through the contaminated soil, thereby entraining contaminants. A microwave/radio frequency (MW/RF) heating system heats the earth's surface and the contaminated soil. By screening the wells only through the contaminated zone and maintaining the contaminated soil zone in a moist state, the entire energy system is focussed on the contaminated region.

U.S. Pat. No. 5,011,329 to Nelson et al discloses an in-situ decontamination method and apparatus for injecting a hot gas into boreholes formed in a contaminated soil area to vaporize the soil moisture and contaminants, and for collecting the vaporized contaminants at the surface of the soil. A burner heats pressurized gases and mixes the same with combustion gases for injecting into the contaminated zone. Controlled heating of the injection gas is effective to sequentially remove different types of contaminants, as well as to provide in-situ oxidation of other contaminants, while minimizing recondensation of the soil vapors.

In U.S. Pat. No. 4,593,760 and U.S. Pat. No. 4,660,639 to Visser et al, volatile contaminants are removed from the vadose zone of contaminated ground by pumping volatilized contaminants from the vadose zone using one or more vacuum extraction wells at ambient temperature.

It has now been found that a more effective distribution of heat and therefore better decontamination of soils containing volatile or semi-volatile contaminants may be achieved through the use of sheet metal pilings containing electrical heaters. In addition, such sheet metal pilings are particularly effective for treating areas having "tight" soil, since such soils do not typically conduct heat in an effective manner, and may be utilized also be particularly effective when used in particular configurations to treat specific sites and prevent the further spread of contamination.

SUMMARY OF THE INVENTION

The present invention is an alternative heater configuration for removing volatile and semi-volatile contaminants from the vadose zone or from a dewatered saturated zone. Standard metal sheet piling (e.g., carbon steel) is modified to include wells for holding heaters at selected locations on the piling. These wells may be in the form of pipes and/or slots, having relatively small diameters, welded to the piling. The piling is then driven into the ground, to the bottom of the zone to be remediated, by known methods. The heaters are then placed in the wells attached to the piling. Alternatively, the heaters can be attached before the sheet piling is driven into the ground. The spacing and type of heater depend upon factors such as the temperature needed for contaminant removal, the area to be treated, and the desired treatment time. Vapor/condensate extraction wells are located near or adjacent the sheet piling and are used to collect the vapors and/or condensate generated during treatment.

DETAILED DESCRIPTION OF THE INVENTION

The present invention is intended for the remediation of volatile and semi-volatile contaminants that are not practically treatable by conventional in-situ vapor extraction at ambient temperature due to their low vapor pressures. Such contaminants include, but are not limited to, organic contaminants such as diesel and fuel oils, crude oil, polychlorinated biphenyls (PCB's), polynuclear aromatics (PNA's), substituted phenols, halogenated hydrocarbons including those which are pesticides as well as other types of pesticides. As used herein, semi-volatile contaminants are contaminants which are not volatile at ambient temperature but become volatile upon heating.

The present configuration offers several advantages over the use of individual heater wells. Since heat conduction along the sheet piling is very fast compared to that through the soil, a much larger surface is used to heat the soil compared to the use of a series of wells. This results in more uniform heating, faster treatment times, and the use of fewer heating elements. Although the term "sheet metal pilings" is used throughout the patent application, any section(s) of metal(s) capable of conducting heat in relatively fast speed such as metal sheets, metal plates, metal slabs, metal blocks, etc. which can be inserted into the contaminated soil and effectively heat the contaminated soil to be remediated are within the scope of the present invention. Preferably, the metal sections are shaped as sheets or slabs with large surface areas having thickness much smaller than the length and width.

Figure 1:
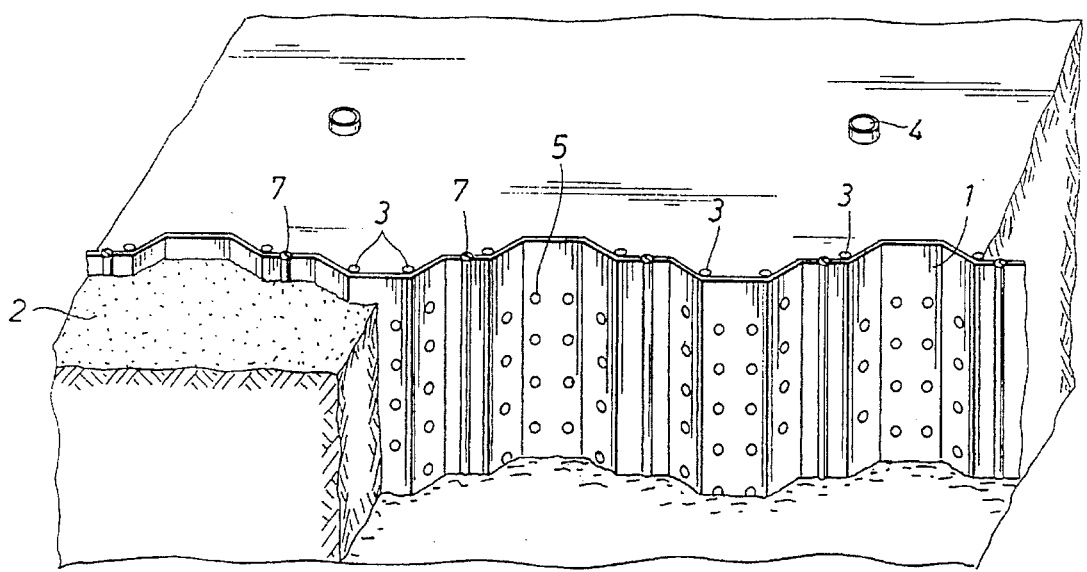
FIG. 1 depicts a cut away side view of the present invention using metal sheet piling which contains perforations.

FIG. 1 illustrates one embodiment for carrying out the process of the present invention. Large sheets of metal piling (1) are placed in the soil through and, in some cases, below the zone of contamination (2). The soil is then heated using a heating means (3) connected in some manner to the metal sheet piling (1). By using a combination of conductive and convective heating, the vapor pressures (P) of contaminants are increased, which in turn increases the rate of volatilization when vapor flow is induced. Table 1 illustrates the increase in vapor pressure for several semi-volatile and non-volatile compounds with temperature increases and the projected increase in removal rate versus conventional soil venting practices.

piling made of materials such as carbon steel, or various types of stainless steels which are corrosion resistance. Preferably, the sheet metal piling is made of a material which demonstrates a high degree of heat conductivity since a higher degree of heat conductivity results in faster and improved heat distribution within the area to be treated. This in turn allows for a more efficient and economical treatment of large areas.

The metal sheet piling (1) need not be in any particular shape or form but may instead be in any variety of shapes or forms. For example, the sheet piling may be flat or include one or more angles, curves and/or indentations as shown in FIG. 1.

Figure 2:
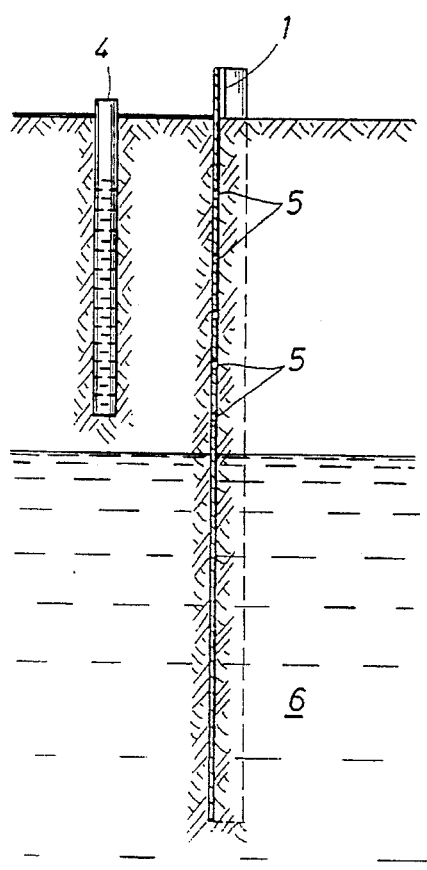
FIG. 2 depicts a side view of one embodiment of the present invention showing the extraction system and metal sheet piling relative to a water table.

The metal sheet piling (1) may be perforated or it may be impermeable to better control the vapor flow through the treatment zone. When perforations (5) are present, they may be in the form of holes, slots, punctures and/or slits. The perforations will typically range in size from about 0.5 to about 5 inches, specifically from about 1 to about 3 inches, more specifically from about 1.5 to about 2.5 inches, although larger or smaller perforations may be used. As illustrative and non-limiting examples, the perforations will comprise from about 10% to about 50%, particularly from about 10% to about 40%, and more particularly from about 10% to about 30% of the total area of the metal sheet piling. In many instances, the perforations will be distributed throughout the metal sheet piling (1) as demonstrated in FIG. 1. In some instances, depending upon the area to be treated, the perforations will be situated in specific positions in the sheet piling. For instance, as shown in FIG. 2, for areas including a water table (6) the perforations (5) should be positioned so that the perforations are above the water table (6) once the metal sheet piling (1) is in place.

The metal sheet piling (1) is also equipped with a plurality of heater means (3). Typically, these heating means will comprise heating wells for the insertion of electrical heaters (not shown). These heater wells are located at various vantage points along the sheet piling (1). The spacing of the heater wells depends upon the temperature needed for contaminant removal, the area to be treated, and the desired treatment time. The heater wells may be formed as part of the sheet metal piling or in the alternative, may comprise slots and/or tubes which are welded to selected locations along the sheet piling. The dimensions of the heater insertion wells will depend upon the size of the heater being inserted. Typically, these wells will be from about 1 to 5 inches, particularly from about 2 to about 4 inches, more particu-

TABLE 1

| COMPOUND | $T_B$ [°C.] | P [atm] | R | P [atm] | R | R [atm] | R |
| --- | --- | --- | --- | --- | --- | --- | --- |
| Dichloropropane | 88 | $7.1 \times 10^{-2}$ | 1 | 1.4 | 20 | 12.4 | 175 |
| Octane | 125 | $1.4 \times 10^{-2}$ | 1 | $4.7 \times 10^{-1}$ | 34 | 5.5 | 393 |
| Napthalene | 217 | $9.3 \times 10^{-5}$ | 1 | $2.5 \times 10^{-2}$ | 263 | $6.6 \times 10^{-1}$ | 7120 |
| Hexadecane | 287 | $9.4 \times 10^{-8}$ | 1 | $1.8 \times 10^{-3}$ | 19000 | $9.6 \times 10^{-2}$ | 1000000 |

$T_B$ - Boiling Point at 1 atm
P - Vapor Pressure
R - Predicted enhancement in removal rate as compared to conventional soil venting at 20° C., based on vapor pressure changes As the soil is heated, a vapor/condensate extraction system is utilized to withdraw volatilized contaminant vapors from the subsurface and any condensate collected in the extraction system. The sheet metal piling (1) used in the present invention comprises any commercially available sheet metal piling including but not limited to sheet metal larly about 3.0 inches in diameter when tubes are utilized; and from about 0.5 to about 3.0 inches by from about 1.0 to about 5.0 inches, particularly from about 1.0 to about 2.0 inches by from about 2.0 to about 4.0 inches, more particularly approximately 1.5 inches by 3 inches when slots are utilized; although larger and smaller dimensions are intended to be within the broad scope of the present invention. The heater wells may also be perforated to allow air flow through the wells thereby convecting heat in the same direction as the conduction.

Any type of commercially available electrical heater may be used. As a non-limiting illustrative example, nichrome/ magnesium oxide tubular heaters is used. Those of ordinary skill in the art will recognize that heat may be generated by any number of other means, such as by the combustion of hydrocarbon vapors within the wells.

Alternatively, electrical heaters in the form of braided heating coils are welded directly to the sheet piling as an integral part of the sheet piling prior to being placed into the soil of the area to be treated.

Individual sheet metal pilings may be used or in the alternative, multiple sheet metal pilings may be connected to form sheet piling templates. By connecting the sheet metal pilings, heat conductivity is optimized between adjacent sheet metal pilings thereby decreasing the number of heaters necessary when individual sheet metal pilings are utilized. When multiple sheet metal pilings are connected, they may be connected in any number of ways either before or after the sheet metal pilings are inserted into the soil of the area to be treated. For example, the metal sheet pilings (1) may include connectors (7) which would allow the metal sheet metal pilings to be inserted into one another either before or after inserted into the soil of the area to be treated. The sheet metal pilings may also be situated in the soil of the area to be treated in such a manner that the sheet metal pilings overlap to some degree thereby achieving substantially the same effect as when the sheet metal pilings are actually connected.

According to one specific embodiment of the present invention, the sheet metal pilings are driven into the ground at least down to the middle point between the surface and the bottom of the zone to be remediated. According to another specific embodiment of the present invention, the sheet metal pilings are driven either to about the bottom of the zone to be remediated or below this zone, by any known method such as pile driving. Once in place, the heaters are inserted into the heater wells. The heaters are then activated and the soil heated. The temperature to which the soil is heated by transfer of thermal energy from the heaters through the soil will depend largely upon the moisture content of the soil and the nature of the particular soil contaminants. Steam stripping occurs any time the soil has a positive moisture content. However, high moisture content soils will require high heat input to remove the moisture. In soils which contain organic contaminants of relatively high boiling points, it is necessary to employ higher soil heating temperatures. Theoretically, the process of the invention is capable of generating soil temperatures as high as 1000° C. and thus is useful for removing soil contaminants having high boiling points. In the case of some oil contaminants, the contaminant will not readily vaporize under the applied thermal energy but will decompose to form gaseous products such as carbon dioxide and water which, in effect "removes" the contamination by means of its destruction. Required treatment temperatures are contaminant-specific and are related to their respective boiling points, which are for most compounds of current interest, in the range of from about 50° C. to about 1000° C., and particularly from about 100° C. to about 400° C.

As a result of the heating, sub-surface vapors are produced. As previously noted, a vapor/condensate extraction system is used to withdraw these vapors. The vapor/ condensate extraction system consists of at least one vapor extraction well (4) located along adjacent or near the sheet metal piling into which contaminant vapors are induced to flow as the result of a pressure reducing means, typically a suction device such as a blower or vacuum pump applied to the well. These vapor extraction wells generally comprise pipes (4) with perforations extending though the earth below the contaminated soil and terminating in or below the contaminated zone. This flow of vapor through the contaminated soil to the perforations serves to promote even heating throughout the soil and provides for more uniform and more efficient decontamination of the soil.

The flow of vapor through the pipes is encouraged by the pressure reducing means (8), typically a vacuum pump, acting in cooperation with the vapor collection manifold means to lower the pressure at or around the vapor collection means. A carbon bed vapor collection means can be varied but there must be at least one vapor collection means (9) and generally there will be a plurality of vapor collection means.

The pressure reducing means (8) is typically a vacuum pump or aspirator connected to the manifold of one or more of the vapor collection pipes. The pressure reduction means is positioned at a location at the surface and is connected to the vapor collection means by at least one conduit. The precise pressure to which the pressure reducing means lowers the ambient pressure at or near the vapor collection means is determined by soil characteristics and geometry of the heater. The achievable range of vacuum is from 0 to about 14.7 psia, practically about 0 to 12 psia, more practically from about 5 to about 14.7 psia.

Also in line with the vapor collection means and the pressure reducing means are vapor separation means which serve to separate the environmentally undesirable vapors from those vapors which may be released into the atmosphere without substantial adverse environmental consequences. Any variety of vapor separation means known in the art may be utilized, including but not limited to, a scrubber or an adsorber which serves to remove by chemical or physical methods the undesirable vapor components, a catalyst bed which serves to decompose the contaminant vapors passing through the bed into vapors which can be released into the atmosphere without adverse effect, thermal incineration with or without a supplementary fuel or any combination of the above means.

Depending on the rate of formation of condensate in the well, a second conduit may be placed inside the well for the collection and removal of condensate. This second conduit may be connected to a downhole pump or to a suction device located at the surface of the ground. Air inlet wells may also be placed in the formation; their purpose is to allow the flow of air, or to force air into the soil formation. The use of such wells may allow the user to better direct vapor flow through the contaminated soil region. Impermeable surface seals may also be used to either insulate the soil surface or to control vapor flow path.

The system collects the vapors and condensate from the extraction wells and sends them to a collection/treatment system which removes or destroys the contaminants before the vapors are discharged to the atmosphere. Vapors may be treated by a number of devices including, but not limited to, thermal oxidation units, catalytic oxidation units, carbon beds, scrubbers, or condensers.

The invention is not limited to treatment of the vadose zone, and some applications may be directed towards contaminants trapped below the normal groundwater level. In the latter case, groundwater extraction wells are also employed to create a "cone of depression", or local drawdown of the groundwater to expose those soils that are normally water saturated. Conduits may be placed within the vapor/condensate extraction wells for the purpose of extracting groundwater.

An insulating means may be employed to reduce heat loss from the heating means to the air above the soil undergoing decontamination. Light weight and durability are desirable characteristics of the soil insulating means. The required thickness of the sheet will depend upon the temperature at which soil heating is conducted as well as the nature of the surface of the soil. For ease in positioning, a thin sheet is preferred although thicker sheets provide greater strength and better insulation which may compensate for the greater cost. Suitable material may be, for example, ceramic fiber or high-grade fiberglass although other materials are contemplated to be within the scope of the present invention. As a specific embodiment of the present invention, one side of the sheet metal is insulated, thereby effectively directing the heat in one direction. As an illustrative non-limiting example, sheet metal pilings are used to form a box, and the outer sides of each piling are insulated, thereby more efficiently directing the heat to the interior of the box.

Figure 3:
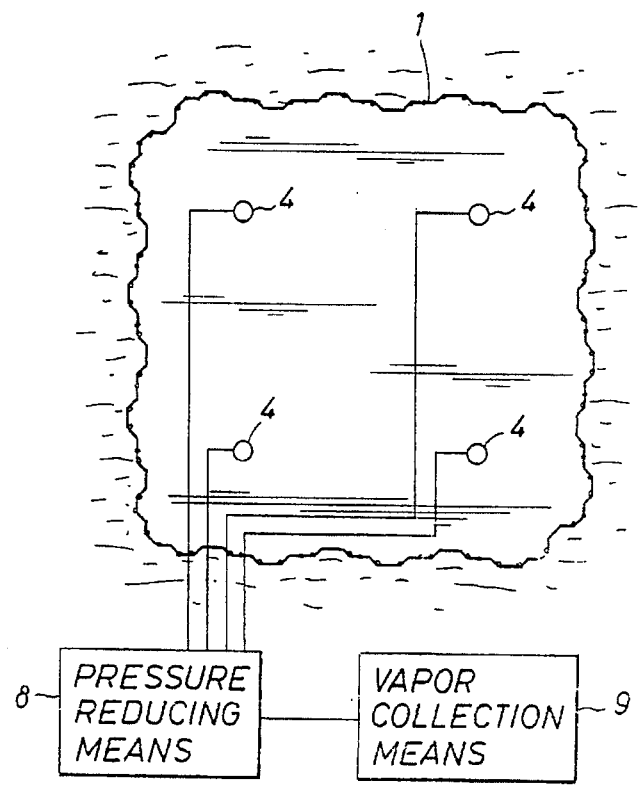
FIG. 3 depicts a plan view of the metal sheet piling, heater and extraction well layout of the invention.

The present invention is particularly suited for treating areas of contamination with defined boundaries thereby providing a more economical treatment process while minimizing the spread of such contaminants to adjacent areas. In such cases, the sheet metal pilings are connected in a manner as illustrated in FIG. 3 to contain the area where contamination is known to exist. The sheet metal pilings may be connected in any manner as discussed supra. The sheet metal pilings will contain perforations. Air will be injected via the heater wells and withdrawn via the extraction wells.

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

We claim:

1. A system for in situ decontamination of contaminated soil in a contaminated zone comprising:
   a. a metal section with a large surface area having thickness much smaller than length and width placed in the contaminated soil extending down through earth terminating in or below the contaminated zone, wherein said metal section has a high degree of heat conductivity,
   b. a heating means attached to said metal section for heating said metal section, and
   c. an extraction system adjacent or near said metal section for withdrawing vapors and condensates generated from heating the contaminated soil.

2. The system as described in claim 1, wherein said metal section is a sheet metal piling.

3. The system as described in claim 1, wherein said contaminated soil comprises contaminant selected from the group consisting of contaminants, semi-volatile contaminants, and contaminants which generate volatile material upon heating.

4. The system as described in claim 1, wherein said metal section is placed in the soil through the bottom of the contaminated zone.

5. The system as described in claim 2, wherein:
   (a) said metal section comprises a plurality of sheet metal pilings connected together; and
   (b) said extraction system comprises:
      (1) an extraction well near or adjacent said sheet metal pilings,
      (2) a vapor collection means, and
      (3) a pressure reducing means connected to the vapor collection means and the vapor extraction well designed to reduce the pressure at or around the vapor collection means to induce the flow of vapor from soil into the extraction well and to the vapor collection means.

6. The system as claimed in claim 5, wherein said metal sheet pilings are perforated.

7. The system as claimed in claim 5, wherein said vapor extraction well is a perforated pipe extending through the earth terminating in or below the contaminated zone.

8. A method for in-situ decontamination of contaminated soil in a contaminated zone, comprising the following steps:
   (1) place a decontamination system into the ground having contaminated soil, which system comprises:
      a. a metal section with a large surface area having thickness much smaller than length and width placed in the contaminated soil extending down through earth terminating in or below the contaminated zone, wherein said metal section has a high degree of heat conductivity,
      b. a heating means attached to said metal section for heating said metal section, and
      c. an extraction system adjacent or near said metal section for withdrawing vapors and condensates generated from heating the contaminated soil;
   (2) applying heat to the metal section via heating means thereby transmitting heat through the metal section to the contaminated soil and heating the soil to from about 50° C. to about 1000° C. to vaporize the contaminant(s); and
   (3) collecting the vaporized contaminant through the extraction system.

9. A method for in-situ decontamination of soil contaminated with of volatile contaminant, semi-volatile contaminant, or contaminant which generates volatile material upon heating, which method comprising the steps of:
   (1) placing a decontamination system into the ground having contaminated soil, which system comprises:
      (a) a plurality of perforated sheet metal pilings connected together, wherein said sheet metal pilings having a high degree of heat conductivity;
      (b) a heating means attached to said sheet metal pilings for heating said metal pilings, and
      (c) an extraction system comprising:
         (i) an extraction well near or adjacent said sheet metal pilings,
         (ii) a vapor collection means, and
         (iii) a pressure reducing means connected to the vapor collection means and the vapor extraction well designed to reduce the pressure at or around the vapor collection means to induce the flow of vapor from the contaminated soil into the extraction well and to the vapor collection means,
   wherein the sheet metal pilings is placed in the soil through the bottom of the zone of contamination;
   (2) applying heat to the sheet metal pilings using heating means thereby transmitting heat through the sheet metal pilings to the contaminated soil and heating the contaminated soil to from about 50° C. to about 1000° C. to vaporize the contaminant(s); and
   (3) collecting the vaporized contaminant through the extraction system.

* * * * *